UNITED STATES PATENT OFFICE.

CARLETON ELLIS, OF MONTCLAIR, NEW JERSEY, ASSIGNOR TO NEW JERSEY TESTING LABORATORIES, A CORPORATION OF NEW JERSEY.

FUEL AND PROCESS OF MAKING SAME.

1,412,233.  Specification of Letters Patent. Patented Apr. 11, 1922.

No Drawing.   Application filed May 10, 1919. Serial No. 296,052.

*To all whom it may concern:*

Be it known that I, CARLETON ELLIS, a citizen of the United States, and a resident of Montclair, in the county of Essex and State of New Jersey, have invented certain new and useful Improvements in Fuel and Processes of Making Same, of which the following is a specification.

This invention relates to products containing oxygenated products of petroleum and relates especially to mixtures or compositions containing the lower aliphatic alcohols especially certain secondary alcohols or ketones corresponding therewith which have been derived from petroleum products and especially from cracked gasoline or cracked petroleum gases. One form of the product is especially suited for use as a fuel in the solid or liquid form and the invention will be illustrated by this embodiment.

As has been shown in contemporaneous applications olefines, such as are present in cracked gasoline or in the gases resulting from the cracking of oils to produce gasoline, may be dissolved in or united with sulphuric acid of a suitable strength and under certain conditions of temperature to form alkyl sulphuric acids which on hydrolysis by heating with water or treatment with steam give alcohols in a large measure corresponding to the olefines from which the product was derived. For example the ordinary still gases from a cracking plant may be treated with sulphuric acid of 1.8 specific gravity and at a temperature preferably around 20° C. to yield an extract that on hydrolysis affords a mixture of iso-propyl alcohol and other alcohols including butyl, amyl and the like, but with iso-propyl alcohol predominating in amount. Such a mixture of alcohols may be used as a fuel as such or incorporated with other materials preferably of a carbonaceous and more or less combustible nature. For example, a solid fuel may be produced by adding a small amount of sodium stearate to the alcohol mixture. On rectification of the alcohol mixture iso-propyl alcohol may be separated from the higher alcohols and the latter may be used as a fuel basis. Ordinarily iso-propyl alcohol retains water tenaciously apparently forming certain hydrates; as the presence of any large amount of water is usually undesirable the latter may be removed by repeated distillation or the use of drying agents. As this method is somewhat costly from the standpoint of production of a fuel in large quantities to be sold at a price competitive more or less with gasoline, some cheaper method of elimination of water is desirable, and I have found this may be accomplished in some cases by treatment with a hydrocarbon in which iso-propyl alcohol dissolves with great ease but with which water does not mix so that the latter is separated. Thus benzol may be used for this purpose as a water eliminant and may remain admixed with the iso-propyl alcohol as a fuel basis to which other hydrocarbons, alcohols, ketones and the like may be added at will.

In a similar manner ketones may be utilized and these may be obtained advantageously from the secondary alcohols produced as above or by direct oxidation of olefines of a suitable character. The ketones obtained, in a general manner, correspond with the alcohol or olefine from which they are derived. Thus from isopropyl alcohol by oxidation with chromic acid or by electrolytic or catalytic oxidation acetone may be obtained; one manner of accomplishing this is to pass isopropyl alcohol admixed with air through a mass of glowing copper or brass gauze whereby the alcohol is largely oxidized to the corresponding ketone, namely, acetone. In like manner methyl ethyl ketone, diethyl ketone and higher ketones may be obtained. These ketones are useful agents in preparing fuel mixtures as they assist other substances of an immiscible or not readily miscible character to mix and blend in a desirable manner.

Products containing these ketones corresponding to the olefines of cracked oils and gases may be solidified by means of soap or nitrocellulose and the like to produce solid fuels which may be shaped or molded into cubes or other form as desired. From these various liquid materials obtainable by the introduction of oxygen or oxygen and hydrogen into olefine compounds various liquid fuel mixtures may be secured which may be employed in internal combustion engines such as automobiles as a substitute for gasoline fuels and possess certain advantages over gasoline in many cases as will be hereinafter more fully noted.

The ethylene which is almost always present in gases of the character described above may be collected in sulphuric acid in the same manner as the higher olefines but in this case stronger acid and a higher temperature is usually used although not always necessary. The strength of acid should be adjusted with respect to the temperature to secure a high degree of absorption. As propylene and the higher olefines are polymerized by hot sulphuric acid or acid that is too strong the absorption of ethylene preferably should take place separately and subsequent to the absorption of all the other olefines. By hydrolysis of the ethylene extract ethyl alcohol is obtained which if desired may be oxidized to acetaldehyde and the latter polymerized more or less for use in fuel mixtures or for other purposes. A solidified alcohol may thus be obtained which consists largely of ethyl alcohol with certain hydrocarbons which accompany the operation. These hydrocarbons are also present in most cases in the propyl and other higher alcohol mixtures resulting from hydrolysis and may be incorporated in the fuel along with the alcohols. Thus the impurities or by-products of the reaction such are regenerated olefines and the like together with any like hydrocarbons which may be entrained by the acid may go into the fuel mixture. Bodies which are produced by polymerization through contact with the acid are in many cases suitable for use as a fuel and the present invention contemplates the use of both light and heavy polymers as fuels in various forms. Thus by passage of still gases through sulphuric acid various useful products are obtained. In their original state these still gases are of no use save as a fuel to be burned at the refinery where the cracking or other operations are carried out. While from these gases are made combustible liquids which may be readily shipped to such distances as are desired and there employed as fuels or for other purposes. Such combustible liquids thus include alcohols, ketones, aldehydes and polymers of high and low boiling point.

The absorption of the olefines in sulphuric acid is facilitated by the presence of a considerable amount of heavy oil and preferably several volumes of heavy petroleum oil are employed to one volume of sulphuric acid. The gases may be bubbled through this mixture under proper conditions of temperature, refrigeration being resorted to when necessary.

With regard to the gases which may be employed in the present invention a considerable degree of latitude is possible. The gases useful for the purpose include those derived by cracking heavy asphaltic oils in so called coking stills, high pressure stills such as Burton stills, various other types of stills working at atmospheric pressure or below atmospheric pressure, tube cracking apparatus into which the heavy oil with or without water or with a small amount of air, is injected and caused to pass through a cracking zone. Other gases such as various modifications of oil gas, including pintsch gas, blau gas and the like may be used. Gases which have been passed through sulphuric acid may be passed through a cracking zone to furnish more unsaturated material. The heating may be carried out under dehydrogenating conditions to facilitate the yield of olefines. If the cracking is carried out under diminished atmospheric pressure an improved yield of olefines is obtained and such procedure constitutes a preferred step of the present invention, but where for other reasons pressure must be employed it is often desirable to use a catalytic material such as nickel or copper in the operation. Dehydrogenation is carried out advantageously with a nickel, copper or brass catalyzer. In a similar manner natural gas or casing head gas and the like may be cracked to produce unsaturated material. Preferably diminished pressure is employed and preferably also a catalyst such as nickel. For example casing head gas may be passed over nickel at a temperature of between 500 and 700° C. and under a pressure of 7 to 8 pounds below atmospheric to yield a mixture of ethylene, propylene and the like which may be duly converted into alcohols or ketones and these employed in fuel mixtures or for other uses in the arts.

An example of a method of making solid propyl alcohol is as follows: $\frac{1}{2}$ a pound of caustic soda is dissolved in 50 pounds of isopropyl alcohol of a crude character if desired containing some hydrocarbons; $2\frac{1}{2}$ pounds of stearic acid are dissolved in 50 pounds of propyl alcohol and warmed. The two solutions are mixed and on cooling a solid product is obtained. The consistency may be modified by using more or less of the caustic soda and stearic acid preferably employing these in equivalent proportions. In the above formula 50 pounds of the propyl alcohol may be replaced by a like amount of acetone or ketones of the nature indicated above, or the proportion of acetone may be increased or decreased if desired.

Similarly a solidified product may be obtained by proceeding as above but adding about 10% of benzol or gasoline.

For making liquid fuels the following formulæ may be employed:

A. Isopropyl alcohol............ 100 parts
   Benzol...................... 20 parts
   Gasoline.................... 200 parts B. Isopropyl alcohol............ 100 parts
   Regenerated olefines......... 10 parts
   Benzol...................... 50 parts C. Propyl alcohol............... 100 parts
   Acetone..................... 100 parts
   Benzol...................... 100 parts D. Mixture of propyl and butyl
   alcohol (2:1) .............. 100 parts
   Gasoline.................... 200 parts
   Ethyl acetate............... 25 parts E. Ethyl alcohol (derived as
   above)...................... 100 parts
   Propyl alcohol.............. 30 parts
   Benzol...................... 30 parts
   Acetone..................... 30 parts
   Gasoline.................... 300 parts F. Ethyl alcohol (derived as
   above)...................... 100 parts
   Isopropyl alcohol........... 10 parts
   Acetone (derived as above)... 50 parts
   Ethyl alcohol (derived by the
   direct acetylation of ethylene extract in sulphuric
   acid) ...................... 50 parts
   Kerosene.................... 100 parts
   Gasoline ................... 100 parts In the foregoing water may be separated from the crude iso-propyl alcohol when the latter is employed and the following will give details of one instance which will illustrate the best manner of making the water separation. Benzol and toluol are better than gasoline for use in effecting water elimination and when a mixture of gasoline and benzol is to be employed with alcohols from petroleum it is desirable to make the separation of water, if the latter is present, after mixing the alcohols and benzol and prior to addition of the gasoline. Being less soluble in gasoline iso-propyl alcohol is likely to be expelled in the aqueous material to some extent at least when the gasoline is added. Thus 7 volumes of iso-propyl alcohol which contained slightly over 2 volumes of water were mixed with 5 volumes of benzol. Immediately a separation of 3 volumes of water containing some iso-propyl alcohol occurred. If at this point gasoline is added to make 20 volumes the volume of aqueous material separated amounts to 3½ volumes or in other words ½ a volume of iso-propyl alcohol is thrown out. On separation of the 3 volumes of the aqueous material the gasoline may then be added to make 20 volumes. To this mixture is added 1½ volumes of methyl acetate boiling at 53-80° C., being a crude mixture containing not more than 50% of methyl acetate. This acts as a clarifying agent. Finally 1½ volumes of regenerated olefines boiling at 85° C. are added.

The acetates which are employed as blending agents may be made by direct acetylation of the sulphuric acid extract by adding acetate of lime, heating and distilling. Preferably the acid extract is somewhat diluted with water before acetylation is carried out, dilution to such an extent as to yield acid of approximately 70% being desirable. Of course the acid reacts with the calcium acetate to give sulphate of lime which is a by-product.

In producing acid extract suitable for making the present products it is desirable to pass the gases into sulphuric acid until the specific gravity falls from say 1.8 or 1.85 specific gravity to 1.3 or 1.4. Ordinarily the gas is passed in a rapid stream into the mixture of acid or mixture of acid and oil so as to keep the liquid violently agitated but not so violently as to cause heavy foaming and priming. If the container in which the acid is being treated with the gas is about twice the capacity or of such size that the mixture of acid and oil fills it only half or two-thirds, then the gas may be passed through at a rate such as to cause a foam which rises nearly to the top of the container. Ordinarily by such rate of flow of the gas with a gaseous mixture carrying 6 to 10% of unsaturated bodies a period of 8 hours will be required to reduce the specific gravity as indicated. On the other hand due to the presence of moisture in the gas the specific gravity of the acid may fall through absorption of water and misleading results will be obtained. When hydrogen sulphide is present in the gas it also reacts tending to weaken the acid and reduce the specific gravity. For these and other reasons the protracted action of the gas on the acid is undesirable and generally speaking 3 to 10 hours is sufficient, giving a good extract and high yield of alcohol, while passage of the same gas for 24 or 48 hours through the acid of like strength might yield a product which on hydrolysis contained little or no alcohol. The treatment of the acid with gas between limiting periods of time as well as limiting ranges of temperature and with acid of predetermined strength also forms a feature of the present invention.

The present invention therefore embraces the production of fuels which contain alcohols, ketones and the like preferably mixed with gasoline and preferably containing an aromatic hydrocarbon such as benzol and in many cases containing kerosene or heavier fuels. Preferably the mixture of these liquids is a homogeneous one so that a clear product is obtained from which gasoline, kerosene or alcohol does not separate to any appreciable extent on standing. When first prepared clear products may be obtained in some cases but on standing separation occurs. Hence it is desirable to test mixtures prepared in accordance with the foregoing procedure to note if they remain homogeneous after a considerable period of time. Products high in kerosene are especially likely to separate and separation may be compensated by additions of acetone or methyl and ethyl acetate or even higher acetates and especially the secondary acetates which may be obtained by the acetylation method set forth above.

Further with reference to the absorption of gases containing unsaturated material in sulphuric acid it should be added that preferably as stated the gas is passed through acid of the desired strength as for example 1.8 specific gravity until the specific gravity has been reduced to 1.3 or 1.4, bearing in mind that the extract may be given a fictitious strength by absorption of water from the gas and also that the acid extract is liable to be weakened by polymerization and through other reactions by protracted passage of the gas therethrough. Hence it is desirable and in fact important to watch the progress of absorption introducing the gases as rapidly as the sulphuric acid or mixture of sulphuric acid and oil will take up the unsaturated material but without such an excessive flow of gas that the mixture primes and is carried out of the apparatus by foaming or entrainment to a considerable degree and in continuing such treatment until the maximum amount of alkyl sulphuric acid is formed. At this point the operation should be stopped and the extract preferably run immediately into water or otherwise diluted in order to prevent polymerization. Or if esters such as the acetate, formate and the like are to be prepared the extract may be treated with the salt of an organic acid as indicated.

What I claim is:—

1. The process of making a fuel from wet alcohols obtained by the hydrolysis of still gas sulphuric acid extract which comprises adding benzol thereto, separating water and dilute iso-propyl alcohol and in adding a substantial volume of gasoline to the benzol propyl alcohol mixture.

2. In the process of making a fuel from alcohols obtained by the hydrolysis of sulphuric acid extract of cracked gasoline or the gases from cracked gasoline which comprises treating the wet alcohols with a solvent in which the alcohol dissolves with great ease whereby water is separated and withdrawn and in diluting the alcohol mixture with a hydrocarbon solvent in which it is less soluble.

3. In the process of making a composite fuel containing alcohols derived from cracked gasoline the step which comprises eliminating water from the wet alcohols by admixture with a volatile hydrocarbon in which the alcohol is very readily dissolved and in removing any water which separates.

4. As a fuel composition, a mixture comprising isopropyl alcohol, benzol, and a hydrocarbon oil.

5. As a fuel composition, a mixture comprising isopropyl alcohol, benzol and gasolene.

6. A fuel composition containing about 100 parts of isopropyl alcohol, about 20 parts of benzol, and about 200 parts of gasolene.

CARLETON ELLIS.

Certificate of Correction.

It is hereby certified that Letters Patent No. 1,412,233, granted April 11, 1922, upon the application of Carleton Ellis, of Montclair, New Jersey, for an improvement in "Fuel and Processes of Making Same," were erroneously issued to "New Jersey Testing Laboratories, a Corporation of New Jersey," whereas said Letters Patent should have been issued to *Seth B. Hunt, trustee, of Mount Kisco, New York*, as assignee, *by mesne assignments*, of the entire interest in said invention, as shown by the records of assignments in this office; and that the said Letters Patent should be read with this correction therein that the same may conform to the record of the case in the Patent Office.

Signed and sealed this 6th day of June, A. D., 1922.

[SEAL.]

WM. A. KINNAN,
*Acting Commissioner of Patents.*